(12) United States Patent
Gray et al.

(10) Patent No.: US 6,497,913 B1
(45) Date of Patent: Dec. 24, 2002

(54) METHOD FOR THE PREPARATION OF AN AERATED FROZEN PRODUCT

(75) Inventors: Sarah Jane Gray, Bedford (GB); Susan Turan, Bedford (GB)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 09/345,114

(22) Filed: Jul. 6, 1999

(30) Foreign Application Priority Data

Dec. 7, 1999 (EP) .............................. 98305400

(51) Int. Cl.[7] .............................. A23G 9/02; A23L 3/015
(52) U.S. Cl. ...................... 426/565; 426/516; 426/519
(58) Field of Search ................................. 426/565, 519, 426/516

(56) References Cited

U.S. PATENT DOCUMENTS

| | | | |
|---|---|---|---|
| 3,914,440 A | * 10/1975 | Witzig | |
| 3,924,018 A | 12/1975 | Sims et al. | |
| 3,928,648 A | 12/1975 | Stahl et al. | |
| 3,956,519 A | 5/1976 | Evans et al. | |
| 4,434,186 A | * 2/1984 | Desia et al. | |
| 4,542,035 A | * 9/1985 | Huang et al. | |
| 4,725,445 A | 2/1988 | Ferrero | |
| 4,758,097 A | * 7/1988 | Iles, Sr. | |
| 5,024,066 A | * 6/1991 | Goavec | |
| 5,084,295 A | * 1/1992 | Whelan et al. | |
| 5,112,626 A | * 5/1992 | Huang et al. | |
| 5,149,557 A | * 9/1992 | Morrison et al. | |
| 5,175,013 A | * 12/1992 | Huang et al. | |
| 5,215,777 A | * 6/1993 | Asher et al. | |
| 5,345,781 A | * 9/1994 | Fels et al. | |
| 5,366,287 A | 11/1994 | Verstallen | |
| 5,472,726 A | * 12/1995 | Bee et al. | |
| 5,486,372 A | 1/1996 | Martin et al. | |
| 5,919,510 A | * 7/1999 | Fayard et al. | |
| 6,010,734 A | * 1/2000 | Whelan et al. | |
| 6,093,438 A | * 7/2000 | Vaghela et al. | |
| 6,187,365 B1 | * 2/2001 | Vaghela et al. | |

FOREIGN PATENT DOCUMENTS

| | | |
|---|---|---|
| DE | 42 26 255 A1 | 8/1992 |
| EP | 0 147 483 A1 | 2/1985 |
| EP | 0 455 288 A1 | 11/1991 |
| EP | 0 469 656 A1 | 2/1992 |
| EP | 0 593 833 A1 | 4/1994 |
| EP | 0 713 650 A1 | 5/1996 |
| WO | WO 92/09209 | 6/1992 |
| WO | WO 97/43914 | * 11/1997 |
| WO | WO 98/09534 | 2/1998 |
| WO | WO 98/09536 | 3/1998 |
| WO | WO 98/18350 | 5/1998 |

OTHER PUBLICATIONS

Arbuckle, "Ice Cream", third edition, pp. 35, 60, 208–215, 266, 1977.*

Byrne, M., "The Heat Is Off", Food Engineering International, 1993, pps. 34–38.

Van Camp, J.; Huyghebaert, A., "Comparative Rheological Study Of Heat And High Pressure Induced Whey Protein Gels", Food Chemistry, 1995, vol. 54, No. 4, pp. 357–364.

Okamota, M.; Kawamura, Y.; Hayashi R.; "Application Of High Pressure To Food Processing: Textural Comparison Of Pressure—And Heat–Induced Gels Of Food Proteins", Agric Biol. Chem, 54 (1), pp 183–189.

Arbuckle, W.S., "Stabilizers and Emulsifiers", Ice Cream, 4th Edition, AVI Publishing, 1986, Chapter 6, pp 84–92.

Arbuckle, W.S., "Development Of The Ice Cream Industry", Ice Cream, 4th Edition, AVI Publishing, 1986, Chapter 1, pp 1–3.

Arbuckle, W.S., "Calculating Cost And Percentage Of Overrun", Ice Cream, 4th Edition, AVI Publishing, 1986, Chapter 10, p. 184–200.

Pelan, B.M.C.; Watts, K.M.; Campbell, J.; Lips, A., "The Stability Of Aerated Milk Protein Emulsions In The Presence Of Small Molecule Surfactants", Journal of Dairy Science, 1997, vol. 80, No. 10, 80:2631–2638.

British Standard Methods for Chemical Analysis Of Ice Cream, Part 3. Determination of Fat Content, 1989, ISO 7328–1984.

XP–002090714, FSTA abstract "Role of Microfluidization in the Manufacture of Frozen Dairy Products", Journal of Dairy Science, 1995, Mississippi State University, vol. 78, p. 149.

* cited by examiner

Primary Examiner—Nina Bhat
(74) Attorney, Agent, or Firm—Gerard J. McGowan, Jr.

(57) ABSTRACT

Using an homogenizer operating at higher pressures (ca. 2000 bar) than those conventionally used in ice cream manufacturing, it is possible to generate smaller oil droplet sizes (ca. 0.3 μm) in an ice cream premix. It allows stabilization of a larger air:water interface, leading to smaller discrete gas cells which in turn modify the organoleptic quality of the ice cream.

7 Claims, No Drawings

METHOD FOR THE PREPARATION OF AN AERATED FROZEN PRODUCT

TECHNICAL FIELD OF THE INVENTION

The invention relates to a method of preparation of an aerated frozen product such as ice cream, wherein at least part of the aerated frozen product premix is subjected to an ultra high pressure treatment. The invention also relates to an aerated frozen product obtained according to this process.

BACKGROUND TO THE INVENTION

Ultra high pressure (UHP) is a known method for killing spores and has been suggested as a suitable route to food product pasteurisation. In Japan a range of pressure de-contaminated products such as jellies, preserves, purees and sauces have been launched on the market (Byrne, M. (1993) Food Engineering International, 34–38).

Furthermore isolated, native proteins have been subjected to UHP. These proteins are in their native form, they have not been treated chemically or thermally before the pressure treatment by methods which significantly modify their protein structure (van Camp, J; Huyghebaert, A (1995) Food Chemistry 54(4) 357–364; Okamoto, M; Kawamura, Y; Hayashi, R; (1990) Agric Biol Chem 54(1) 183–189). It is generally believed that there would be no advantage in subjecting proteins which have already been substantially denatured by for example an initial heat-treatment prior to UHP.

DE 42 26 255 discloses the treatment of cream with ultra high pressure in order to crystallise the fat.

It has now been discovered that the presence of a fine microstructure is critical to produce the correct texture and quality of ice cream. Organoleptic evaluation of ice cream done by the applicant of the present invention has shown that small air cells and ice crystals are associated with increased creaminess and reduced iciness, which are recognized parameters for good quality ice cream. For example, for a given ice cream formulation, a reduction in gas cell and/or ice crystal size will enhance creamy texture (and reduce ice crystal perception, nevertheless the sensory attributes are not directly influenced by the de-emulsified fat level. However, the ice cream microstructure produced in a scraped surface heat exchanger (freezer) has been found to be unstable and both ice and air structure coarsen significantly in the time taken to harden the product to typical storage temperatures of −25° C. Therefore, an important step to achieve small gas cells in ice cream is to stabilize gas cells during hardening.

To retain the desired microstructure, it has now been found that it is necessary to generate a partial network of fat aggregates adsorbed onto the air interface to provide a steric barrier to gas cell coalescence. To generate this fat network, a proportion of the oil droplets need to partially coalesce as a consequence of the shear regime encountered within the ice cream freezer. It is known that the collision efficiency (the probability of two colliding droplets remaining permanently in contact) can be significantly affected by the initial droplet size and the protein surface coverage. The collision efficiency decreases as the droplet size decreases. However, small molecule surfactants can displace protein at the oil:water interface and allow a higher collision efficiency at a given droplet size.

In the processing of ice cream, an homogenization step is used to generate small oil droplets, preferably with a mono-modal size distribution to allow the controlled fat destabilization under shear. For an ice cream premix, the average droplet size, d[3,2], upon homogenization is typically 0.6–1.0 μm. Numerous process and product variables affect homogenization efficiency. Those which have been found to have the largest effect on the final droplet size distribution are the dispersed phase volume, the type and level of surfactant used and, in particular, the pressure applied during homogenization. It has now been found that by using an homogeniser operating at higher pressures (ca. 2000 bar) than those conventionally used (ca. 150 bar), it is possible to generate smaller oil droplet sizes (ca. 0.3μm) in an ice cream premix.

Generation of significantly smaller, and therefore a higher number of, oil droplets can allow stabilization of a larger air:water interface, leading to smaller discrete gas cells which in turn alter the organoleptic quality of the ice cream. However, it has now been discovered that very small oil droplets will give inherently stable ice cream mixes which will not generate the desired microstructure unless the desired level of fat partial coalescence occurs. To achieve this, it is necessary to either increase the collisional force between the droplets or reduce the steric barrier to coalescence. This is achieved by either optimizing the applied shear stress during processing or by manipulating the interfacial composition by the appropriate selection of emulsifiers.

It has also been discovered that the sensory properties of ice cream is dependent on the size of the fat droplets. For a given air cell size, the ice cream with the smallest fat droplets scores best on creaminess when blind tested by a trained panel.

Definitions

Emulsifiers

Emulsifiers are defined as in Arbuckle, W. S., Ice Cream, 4th Edition, AVI publishing, 1986, ch 6 p92–94.

Stabilizers

Stabilizers are defined as in Arbuckle, W. S., Ice Cream, 4th Edition, AVI Publishing, 1986, ch 6, p84–92. They can for example be locust bean gum, carrageenan, guar gum, gelatin, carboxy methyl cellulose gum, pectin, algin products and mixtures thereof.

Frozen Aerated Dessert

A definition of a frozen aerated dessert can be found it Arbuckle, W. S., Ice Cream, 4th Edition, AVI Publishing, 1986, ch 1, p1–3. Preferably, a frozen areated dessert according to the invention is a milk or fruit based frozen aerated confection such as ice cream. An ice cream is a frozen food made by freezing a pasteurized mix with agitation to incorporate air. It typically contains ice, air, fat and a matrix phase and preferably;

milk/dairy fat 3 to 15% (w/w)
milk solids non fat 2 to 15% (w/w)

sugar and other sweeteners 0.01 to 35% (w/w)
flavours 0 to 5% (w/w)
eggs 0 to 20% (w/w)
water 30 to 85% (w/w)

Overrun:

Overrun is defined as in Ice Cream—W. S. Arbuckle—Avi Publishing—1972—page 194.

Destabilising Emulsifier

Destabilising emulsifier means any emulsifier which gives, at a level of 0.3%, a level of extracted fat of at least 25% in an ice cream premix containing 12% butter oil, 13% skim milk powder and 15% sucrose as described in on figure 4 in 'The stability of aerated milk protein emulsions in the presence of small molecule surfactants' 1997—Journal of Dairy science 80:2631:2638.

Examples of such destabilising emulsifiers are unsaturated monoglyceride, polyglycerol esters, sorbitan esters, stearoyl lactylate, lactic acid esters, citric acid esters, acetylated monoglyceride, diacetyl tartaric acid esters, polyoxyethylene sorbitan esters, lecithin and egg yolk.

Methods

Ice Cream Premix Production

In a jacketed 500 liter mix tank, water is added at 85° C., then milk powder, sugar, stabilizers, butteroil with emulsifier dissolved are added and mixed with high shear mixer and heated to maintain a temperature of 65° C. for standard production and 55° C. for production according to the invention:

Standard production: the premix is heated with plate heat exchanger to 83° C., homogenize with Crepaco single stage valve homogeniser at 140 bar. After holding at 83° C. for 15 seconds the mix was cooled with a plate heat exchanger to 5° C. and held at this temperature for at least two hours prior to freezing.

Invention: the premix was heated with a plate heat exchanger to 83° C. and held at this temperature for 15 seconds to pasteurize the mix. The mix was tempered at 55° C. (+/−5° C.) in a holding tank prior to homogenization and collected after a single pass through the homogeniser (Nanojet Impinging Jet, ref: Verstallen, A., Apparatus for homogenizing essentially immiscible liquids for forming an emulsion described in U.S. Pat. No. 5,366,287) at an input pressure of 1600 bar (+/−50 bar). During homogenization there is a temperature rise of 2–2.5° C./100 bar. Immediately after homogenization the mix is passed through a plate heat exchanger and cooled to 8° C. (+/−3° C.). The mix is held in a jacketed aging vessel at this temperature for at least two hours prior to freezing.

Ice Cream Processing

The mix was processed according to two different routes.

Standard Freezer

The mix was aged overnight and was processed through an ice cream freezer (Crepaco W104 freezer (SSHE) with a series 80 dasher operating at 4 bar barrel pressure). All ice cream was produced at a mix throughput of 120 l/hr at 60% or 100% overrun with an extrusion temperature of −6.0° C. and −5° C. respectively. Ice cream was collected in 500 ml waxed paper cartons and hardened in a blast freezer at −35° C. for two hours.

Single Screw Extruder

The outlet of the SSHE was connected to a single screw extruder (SSE) (as described in WO98/09534) resulting in exit temperatures of ca. −14.5° C.

Tests

Fat Composition

Fat composition analysis was carried out according to the Rose-Gottlieb method: British Standard Methods for Chemicals analysis of ice cream, Part 3. Determination of fat content (BS2472: part 3: 1989 ISO 7328–1984).

Pieces of ice cream are randomly selected to give a total mass of approximately 100 g, placed in a blender jar, covered with a lid and allowed to soften at room temperature. This mix is then blended for two minutes (up to 7 minutes for products containing particulates, e.g. nuts) to obtain a homogeneous mixture. The temperature is kept below 12 C during softening and blending. 4 to 5 g (accurately measured to 1 mg) are weighed into a fat extraction flask and water at 65 C is added to obtain a total volume of 10 ml and mixed thoroughly. Ammonia solution (2 ml, 25% (m/m) of NH3) is added and the flask immediately heated at 65 C for 15–20 minutes in a water bath and cooled to room temperature at which time ethanol (10 ml) is added. Diethyl ether (25 ml) is added and the flask shaken vigorously for 1 minute. Light petroleum (25 ml) is the added and the flask shaken for 30 seconds. The stoppered flask is allowed to stand for 30 minutes before decanting the supernatant. The solvent is then removed by evaporation or distillation. The fat content is expressed as a percentage by weight.

Gas Cell Sizing

The microstructure of all ice cream samples was visualized by Low Temperature Scanning Electron Microscopy (LTSEM). All samples were stored at −80° C. prior to structural analysis using a JSM 6310F scanning electron microscope fitted with an Oxford Instruments ITC4 controlled cold stage. The samples were prepared using the Hexland CP2000 preparation equipment. A sample at −80° C. of size 5×5×10 mm was taken from the centre of a 500 ml block of ice cream. This sample was mounted onto an aluminium stub using OCT mountant on the point of freezing and plunged into nitrogen slush. OCT is an aqueous based embedding medium used primarily for cryotome preparation of material for light microscopy. It is also called tissue tek and is supplied by Agar Scientific. The advantage of using oct rather than water to mount the samples for electron microscopy is that when OCT changes from liquid to solid ie. freezes it changes to opaque from transparent allowing visual identification of the freezing point. Identification of this point allows the sample to be mounted using a liquid at its coldest just prior to solidifying which will give support during rapid cooling. The sample was warmed to −98° C. fractured and allowed to etch for 2 minutes before cooling to −115° C. The surface was coated with Au/Pd at −115° C., 6 mA and 2×10−1 mBar Argon. The sample was transferred in vacuum to the LTSEM and examined under microscope conditions of −160° C. and 1×10−8 Pa.

The gas structure in ice cream was quantified by measuring the gas cell size distribution from SEM images using the AnalySIS 2.11—package AUTO (SIS Munster, Germany) with 'B' version software. The AnalySIS programme may be run using SEM images in two data formats, either as data direct from the JEOL microscope or as images scanned from Polaroids. All gas cell sizes were measured from SEM micrographs. The optimum magnification was such that there were less than 300 gas cells per image. The programme was used semi-automatically such that particle edges were calculated automatically (by difference in grey-scale) and refined manually (by deleting and redrawing around particle boundaries not selected correctly). Since ice crystals may also have been selected by the programme, the gas cells were then manually selected and the distribution analyzed using the maximum diameter parameter. All gas cells present on an SEM micrograph were counted and up to six SEM images were used. Generally, at least 1000 gas cells were counted. The average size was determined as the number average, d(1,0), of the individual cell sizes.

Premix Fat Droplet Sizing

Particle sizes in the premix emulsion were measured using a Malvern Mastersizer (Malvern Instruments, UK) with water as the continuous phase using the 45 mm lens and the presentation code 2 NAD. Ultrasound was applied to the Mastersizer tank for one minute before measurement. The surface weighted mean d[3,2] was calculated. The diameter by which 90% by volume of the distribution was smaller, d[0.9] was taken as the limit of individual fat droplets.

Ice Cream Fat Droplet and Fat Aggregates

Two different methods were used.

Mastersizer Method:

20 ml sample of ice cream was heated to 60° C. for 5 minutes, added to the Malvern Mastersizer water bath, then sonicated for 2 minutes. The average droplet size, d[3,2] and size distribution were measured. The proportion of fat aggregates in the melted ice cream was calculated as the proportion of fat (expressed as % volume) with a particle size greater than the d[0.9] determined for the unaggregated premix fat droplets.

Solvent Extraction Method:

10 g sample (W1) is weighed into a measuring cylinder and left at room temperature to melt for 4 hours. 50 ml petroleum spirit is added, the cylinder stoppered and inserted into a mechanical agitator. The cylinder is inverted for one minute at a rate of one inversion per second and then allowed to stand for 5 minutes and the solvent decanted in to a pre-weighed beaker (W2). A further 25 ml solvent is added and the cylinders inverted 3 times by hand. After standing (2–3 minutes) the solvent layer is decanted again into the beaker. The beaker is placed in a fume cupboard overnight to evaporate the solvent and then dried in a spark proof oven at 100 C for 15–30 minutes. The beaker is then cooled in a dessicator and reweighed (W3). The percentage of de-emulsified fat is [(W3 −W2)/(C×W1)]×100 where C is the percentage of fat in the ice cream divided by 100.

General Description of the Invention

It is a first object of the present invention to propose a process for manufacturing a frozen aerated product having an overrun of between 20% and 180%, preferably between 60% and 100%, comprising the steps of;
    producing a premix a premix comprising 2 to 15% fat (w/w), up to 1% (w/w) emulsifier, and 45 to 85% (w/w) of water,
    homogenizing the premix in order to produce fat droplets having a d(3,2) below 0.6 micron, preferably below 0.5 micron, even more preferably below 0.4 micron,
    cooling, freezing and aerating the homegenised premix. The product can then be extruded and optionally deep frozen.

This enables the production of smaller fat droplets which in turn generate smaller air cells, preferably wherein the mean gas cell size d(1,0) is below 20 micron, more preferably below 10.5 micron. It has also been found that out of two ice creams with the same composition and the same air cell size, the one with the smallest fat droplets was found to be the preferred one when tasted by a trained panel.

In a first preferred embodiment of the invention the homogenising step takes place at a pressure of between 1000 and 2000 bar, preferably between 1400 and 1800 bar.

In a second preferred embodiment of the invention, the premix contains a destabilising emulsifier. Preferably the destabilising emulsifier is selected from the group consiting of unsaturated monoglyceride, polyglycerol esters, sorbitan esters, stearoyl lactylate, lactic acid esters, citric acid esters, acetyllated monoglyceride, diacetyl tartaric acid esters, polyoxyethylene sorbitan esters, lecithin and egg yolk. More preferably the destabilising emulsifier is unsaturated monoglyceride. Preferably also the (destabilising emulsifier/ fat) weight ratio of the premix is between 10:1500 and 15:300, even more preferably between 15:1200 and 15:600.

The incorporation of destabilising emulsifier, and particularly unsaturated monoglycerides, allows for the production in a SSHE of a frozen aerated product with gas cells smaller than the one obtained by freezing a premix in a SSHE followed by cold extrusion in a SSE as disclosed in WO98/09534.

In a third preferred embodiment of the invention, the homegenized premix is first frozen at a temperature of between −4 C and −7 C in a scrapped surface heat exchanger and then extruded in a screw extruder at a temperature of between −10 C and −18 C. Even more preferably, the screw extruder is a single screw extruder.

The combination of Ultra High Pressure homogenization together with cold extrusion, allows the production of an aerated product product with gas cells smaller than the one obtained by freezing a premix in a SSHE followed by cold extrusion in a SSE as disclosed in WO98/09534.

Preferably also, the temperature of the premix prior to homogenisation is above 50 C. More preferably, the homogenisation generates a temperature rise of the premix of between 30 C and 45 C. By so doing it is no longer necessary to use a plate-pack heat exchanger for pasteurisation. Moreover, by starting with a temperature of the premix, prior to homogenization of above 50 C while having a temperature rise of below 45 C, it is posiible to reach a temperature after homogenisation which is not above 95 C, something which prevents the water from boiling, something which would generate bubbles in the premix.

Before, or after homogenization, it is possible to have a pasteurization step.

It is a second object of the present invention to provide a frozen aerated product, having an overrun of between 20% and 180%, preferably between 60% and 100%, and comprising 2 to 15% (w/w) of fat and destabilising emulsifier in a (destabilising emulsifier /fat) weight ratio of between 10:1500 and 15:300, preferably between 15:1200 and 15:600.

Preferably the destabilising emulsifier is selected within the group consiting in unsaturated monoglyceride, polyglycerol esters, sorbitan esters, stearoyl lactylate, lactic acid esters, citric acid esters, acetyllated monoglyceride, diacetyl tartaric acid esters, polyoxyethylene sorbitan esters, lecithin and egg yolk. More preferably the destabilising emulsifier is unsaturated monoglyceride.

More preferably the (destabilising emulsifier/fat) weight ratio of the frozen aerated product is between 10:1500 and 15:300, even more preferably between 15:1200 and 15:600.

It is a third object of the present invention to provide a frozen aerated product having an overrun of between 20% and 180%, preferably between 60% and 100%, and comprising 2 to 15% (w/w) of fat, wherein the mean gas cell size d(1,0) is below 10.5 micron.

DETAILED DESCRIPTION OF THE INVENTION

The present invention will be further described in the following examples.

EXAMPLE 1

In this example various premixes were produced, homogenised and pasteurised according to the prior art and then processed in a SSHE, some of the samples produced in the SSHE being then processed in a SSE.

The various premixes had the following composition (the 5 composition are indicated in % w/w)

|  | A | B | C | D | E | F |
| --- | --- | --- | --- | --- | --- | --- |
| Emulsifier (*) | 0.39 | 0.39 | 0.39 | 0.39 | 0.39 | 0.3 |
| Corn Syrup |  | 2.2904 | 3.3861 | 4.4818 | 6.6732 | 6 |
| Stabiliser | 0.2 | 0.2 | 0.2 | 0.2 | 0.2 | 0.22 |
| Whey protein | 2.6 | 2.6 | 2.6 | 2.6 | 2.6 |  |
| Sucrose | 15.6 | 15.1878 | 14.9906 | 14.7933 | 14.3989 | 13 |
| Skimmed Milk Powder | 7.4 | 7.4 | 7.4 | 7.4 | 7.4 | 13 |
| butter fat | 12.1 | 10 | 9 | 8 | 6 | 3 |
| Flavour | 0.254 | 0.254 | 0.254 | 0.254 | 0.254 | 0.12 |
| Water | 61.456 | 61.6778 | 61.7793 | 61.8809 | 62.0839 | 64.36 |

(*) Admul MG 4223 (referred as MGP in the rest of the description) which is a mono/diglyceride prepared from edible vegetable oil and commercially available from Quest International.

The above premixes were then homogenised and pasteurised at a temperature of 81–84 C for about 12 seconds at a pressure of 140 bar.

The obtained pre-mixes were then processed in a SSHE under the following conditions. Ice creams at a temperature of −6 C (+/−0.1 C) with an overrun of 60% (+/−1%) were produced.

|  | A | B | C | D | E | F |
| --- | --- | --- | --- | --- | --- | --- |
| Input temperature | 8.8° C. | 12.8° C. | 16.2° C. | 8° C. | 14.5° C. | 9.5° C. |
| Output Temperature | −6.1° C. | −6° C. | −6° C. | −6.1° C. | −6.1° C. | −6.2° C. |
| overrun | 61% | 60% | 60% | 61% | 61% | 60% |
| barrel pressure | 4 bar | 4.06 bar | 3.99 bar | 4 bar | 3.98 bar | 4 bar |

Part of the samples A,B,C,D,E and F were then processed in a single screw extruder at an input temperature of −6 C giving an extruded product at a temperature of between −14 C and −15 C.

EXAMPLE 2

The premixes A, B, C, D,E and F of Example 1 were pasteurised at a temperature of 81–86 C for 12 seconds.

The pasteurised premixes were then homogenised in a Nanojet 200/2000 (commercially obtainable from Nanojet—Germany ). A detailed description of such a homogeniser can be found in U.S. Pat. No. 5,366,287. The premixes were input into the homogeniser at a temperature of 54–58 C and treated at a pressure of 1600 bar. The temperature at the outlet of the homogeniser was between 91 and 95 C.

The obtained homogenised premixes were then processed in a SSHE under the following conditions.

|                  | A       | B       | C        | D       | E       | F       |
|------------------|---------|---------|----------|---------|---------|---------|
| Input temp       | 18.7° C.| 13.2° C.| 13.5° C. | 11.2° C.| 11.0° C.| 9.5° C. |
| Output temp      | −6.3° C.| −5.8° C.| −6.7° C. | −6.0° C.| −6.4° C.| −6.2° C.|
| overrun          | 60%     | 60%     | 61%      | 60%     | 60%     | 60%     |
| barrel pressure  | 4 bar   | 4 bar   | 4.01 bar | 4 bar   | 4 bar   | 4 bar   |

Part of the samples A to F were then processed in a single screw extruder and produced ice cream at a temperature of between −14 C and −15 C.

EXAMPLE 3

The premix compositions in example 1 were modified, the emulsifier being now a blend of Admul MG 4223 (0.24% w/w based on the total weight of the premix) and H7804 (0.15% w/w based on the total weight of the premix) for samples F,G,I and J and a blend of Admul MG 4223 (0.265% w/w based on the total weight of the premix) and H7804 (0.125% w/w based on the total weight of the premix) for sample H. H7804 is an unsaturated monoglyceride commercially available from Quest International. Admul MG 4223 (referred as MGP in the rest of the description) is a mono/diglyceride prepared from edible vegetable oil and commercially available from Quest International.

|                       | F       | G       | H       | I       | J       |
|-----------------------|---------|---------|---------|---------|---------|
| Emulsifier (MGP + M7804) | 0.39 | 0.39    | 0.39    | 0.39    | 0.39    |
| Corn Syrup            |         | 2.2904  | 3.3861  | 4.4818  | 6.6732  |
| Stabiliser            | 0.2     | 0.2     | 0.2     | 0.2     | 0.2     |
| Whey protein          | 2.6     | 2.6     | 2.6     | 2.6     | 2.6     |
| Sucrose               | 15.6    | 15.1878 | 14.9906 | 14.7933 | 14.3989 |
| Skimmed Milk Powder   | 7.4     | 7.4     | 7.4     | 7.4     | 7.4     |
| butter fat            | 12.1    | 10      | 9       | 8       | 6       |
| Flavour               | 0.254   | 0.254   | 0.254   | 0.254   | 0.254   |
| Water                 | 61.456  | 61.6778 | 61.7793 | 61.8809 | 62.0839 |

The obtained premixes were then pasteurised at a temperature of 81–85 C for 12 seconds and homogenised as in example 2. The premixes were input into the homogeniser at a temperature of 55–65 C and treated at a pressure of 1600 bar. The temperature, at the outlet of the homogeniser was between 89 and 92 C.

The pasteurized and homogenized premixes were then processed in SSHE under the following conditions.

|                    | F        | G       | H       | I       | J        |
|--------------------|----------|---------|---------|---------|----------|
| Input temperature  | 13° C.   | 16° C.  | 16.9° C.| 11.5° C.| 11.7° C. |
| Output Temperature | −5.7° C. | −5.9° C.| −6.0° C.| −6.0° C.| −6.1° C. |
| Overrun            | 60%      | 60%     | 60%     | 59.5%   | 59%      |
| barrel pressure    | 4.01 bar | 4 bar   | 4 bar   | 4 bar   | 3.98 bar |

Fat Droplets Particle Size

Fat droplets particle of each premix after homogenisation was measured. The results are summarized in the following table.

| Fat Content (%)          | 3    | 6    | 8    | 9    | 10   | 12   |
|--------------------------|------|------|------|------|------|------|
| Example 1 d (3, 2) (microns) | 0.42 | 0.45 | 0.51 | 0.53 | 0.50 | 0.53 |
| Example 1 d (0, 9) (microns) | 1.24 | 1.19 | 1.36 | 1.44 | 1.56 | 1.59 |
| Example 2 d (3, 2) (microns) | 0.34 | 0.34 | 0.39 | 0.39 | 0.36 | 0.35 |
| Example 2 d (0, 9) (microns) | 0.9  | 0.83 | 1.14 | 1.64 | 0.94 | 1.03 |
| Example 3 d (3, 2) (microns) |      | 0.34 | 0.32 | 0.31 | 0.36 | 0.35 |
| Example 3 d (0, 9) (microns) |      | 0.83 | 0.94 | 0.72 | 0.86 | 0.92 |

Aggregated Fat

The percentage of aggregated fat was measured both using the Mastersizer method and the solvent extraction method.

| Fat Content (%)  | 3    | 6     | 8     | 9     | 10    | 12    |
|------------------|------|-------|-------|-------|-------|-------|
| Mastersizer method | | | | | | |
| Example 1 SSHE   | 8.24 | 20.69 | 28.60 | 37.05 | 17.44 | 20.02 |
| Example 1 SSE    |      | 26.97 | 41.78 | 53.80 | 64.47 | 66.98 |
| Example 2        | 18.8 | 25.46 | 37.88 | 39.46 | 54.12 | 62.56 |
| Example 3        |      | 52.13 | 66.20 | 62.44 | 68.45 | 80.10 |
| Solvent Extraction | | | | | | |
| Example 1 SSHE   | 7.6  | 10.04 | 21.38 | 22.2  | 23.27 | 15.44 |
| Example 1 SSE    | 3.96 |       | 37.83 | 50.54 | 66.66 | 65.48 |
| Example 2        | 3.18 | 4.20  | 3.01  | 6.10  | 3.17  | 6.69  |
| Example 3        |      | 8.19  | 26.54 | 18.12 | 5.57  | 46.88 |

By comparing the results generated by the two methods, it can be seen that, owing to the small size of the droplets in examples 2 and 3, the results which are obtained when using solvent extraction are not consistent, and show no trend. It is due to the fact that it is difficult for the solvent to extract the fat from agglomerates made out of small fat droplets. It is the reason why, in order to characterize the products of the present invention, the first method (Mastersizer) is preferred.

Mean Gas Cell Size:

The mean gas cell size (d(1,0)) of all the samples was measured in microns, the results are summarized herebelow.

| Fat Content (%) | 3 | 6 | 8 | 9 | 10 | 12 |
|---|---|---|---|---|---|---|
| Example 1 SSHE | 66.57 | 31.35 | 20.49 | 24.39 | 23.38 | 18.8 |
| Example 1 SSE | 12.00 | 12.28 | 10.31 | 12.51 | 11.49 | 12.8 |
| Example 2 | 10.3 | 9.42 | 8.42 | 9.71 | 10.4 | 9.81 |
| Example 3 | 9.49 | 9.4 | 9.59 | 9.46 | 9.86 | 8.99 |

Example 1 shows that, except at high fat content (above 10%), it is not possible using a standard SSHE to produce a product with a mean gas cell size of below 20 microns when using MGP as emulsifier system whereas this is a standard emulsifier used in the ice cream industry. It is only by using a specific type destabilising emulsifier that when using a standard SSHE a mean gas cell size of below 20 microns is achieved.

What is claimed is:

1. Process for manufacturing a frozen aerated product having an overrun of between 20% and 180%, comprising the steps of;

producing a premix comprising a destabilizing emulsifier, 2 to 15% fat (w/w) up to 1% (w/w) emulsifier, and 45 to 85% (w/w) of water, and wherein the (destabilizing emulsifier/fat) weight ratio of the premix is between 10:1500 and 15:300, homogenizing the premix in order to product fat droplets having an average droplet size below 0.6 micron, cooling, freezing and aerating the homogenized premix, the homogenizing step taking place at a pressure of between 1000 and 2000 bars.

2. Process according to claim 1 wherein the destabilizing emulsifier is selected from the group consisting of unsaturated monoglyceride, polyglycerol esters, sorbitan esters, stearoyl lactylate, lactic acid esters, citric acid esters, acetylated monoglyceride, diacetyl tartaric acid esters, polyoxyethylene sorbitan esters, lecithin and egg yolk.

3. Process according to claim 1 wherein the (destabilizing emulsifier/fat) weight ratio of the premix is between 15:1200 and 15:600.

4. Process according to claim 1 comprising the step of homogenizing the premix in order to produce fat droplets having an average droplet size below 0.5 micron.

5. Process according to claim 1 comprising the step of homogenizing the premix in order to produce fat droplets having an average droplet size below 0.4 micron.

6. Process according to claim 1 wherein the homogenizing step takes place at a pressure of between 1400 and 1800 bar.

7. Process according to claim 6 wherein the homogenizing step takes place at a pressure of between 1400 and 1800 bar.

* * * * *